Patented Apr. 5, 1927.

1,623,588

UNITED STATES PATENT OFFICE.

EDWARD F. GERMAIN, OF SAGINAW, MICHIGAN, ASSIGNOR TO LOUIS GERMAIN, JR., ALBERT A. GERMAIN, AND JOSEPH HEIDENKAMP, ALL OF PITTSBURGH, PENNSYLVANIA, AND EDWARD F. GERMAIN, OF SAGINAW, MICHIGAN, TRUSTEES.

PROCESS OF MAKING FIBROUS COMPOSITION AND ARTICLES PRODUCED THEREFROM.

No Drawing. Application filed February 8, 1926. Serial No. 86,941.

This invention relates to a composition of matter in the nature of a plastic mass capable of being molded under pressure while hot to form containers of various kinds and other articles that are required to possess the qualities of resistance to action of acids, high dielectric and heat resistance, elasticity to resist shocks without cracking, tensile strength and toughness.

The invention also relates to a new method of manipulating the said composition or plastic mass as soon as it has been compounded and before it is placed in the mold. The new manipulation increases the physical strength of the molded articles, improves its smoothness and polished appearance, and properly controls the flow of the mass into all parts of the mold cavity while the forming plunger is descending. My method of manipulation avoids the formation of air or steam pockets in the finished article and it enables quantities of the hot material to be prepared and kept on hand ready for the molding press, thereby increasing the daily output. The methods heretofore commonly used required that each batch of material be placed in the press immediately after mixing to prevent premature hardening and to better insure uniform quality in the finished articles.

Under my present novel method a number of molding-press batches may be prepared and kept a considerable length of time without likelihood of hardening on the outside and without impairing their original uniform consistency.

For the purpose of describing the novelty and utility of my invention I shall explain it with reference to its employment in the making of multiple cell battery boxes, because such boxes are fairly representative of the kind of articles to the production of which my improved composition and method are especially well adapted.

The objects of the invention, therefore, with respect to manufacture of composition battery boxes are, to improve the physical strength of the box, its dielectric strength, its resistance to heat and to the action of acid, and its flexibility throughout a wide range of temperature changes. Smoothness of the finished article is a characteristic of my invention as distinguished from the wavy and imperfect surfaces usually produced from bituminous mixtures molded under heavy pressure.

These articles will be more clearly understood after individual reference has been made to each of the principal characteristics possesed by boxes made according to my new method.

*Physical strength.*—The composition box must have great physical strength at normal atmospheric temperatures in order to resist impact and to withstand such physical tests as the following: Dropper from a height of say, ten feet, upon a concrete floor, the box should not crack, even though the impact be severe enough to chip off a small corner or an edge. When the holding clamps are screwed down tightly upon the edge, or upon the handle of the box, in the manner commonly employed for clamping battery boxes to automobile bodies, no sign of crushing, distortion under pressure, or other physical weakness shall develop in the box.

*Dielectric strength.*—The box must have great dielectric strength to resist penetration by electric currents. The mixture herein described has under repeated tests shown a dielectric strength of up to twenty-five thousand volts, being many times that necessary to assure the requisite life and durability of a battery box.

*Heat resistance.*—The battery box material must have sufficient heat resistance to withstand the heat generated during constant use both while charging and discharging the battery. It must, therefore, withstand a heat test such as the following:

If it is heated with a blow torch, by passing the flame over the entire inside and outside surfaces until the box is considerably hotter than would ever be experienced in actual service, and the heated box is then put into a vise and pressure applied in varying degrees, there must be no deflection of the outside walls, partitions or bottom, under squeezing stresses considerably greater than would be likely to occur in practical use. Under severe stresses the partitions and walls must show but very little deflection. To assure strength and long life to the battery box the inside partitions must not warp when the container is heated.

*Acid resistance.*—To assure that the box is reasonably resistant to acid it must be able to withstand severe tests, one of which is immersion for about three months in hot sulphuric acid, fourteen hundred specific gravity, which is considerably stronger than ordinarily used in batteries, maintained during all that time at one hundred fifty degrees Fahrenheit. At the end of that time its walls must show no signs of corrosion or weakening.

*Flexibility.*—Under conditions of use a battery box is subject to varying degrees of temperature and at the same time to hard usage, shocks, jolts from road service, rough handling while being clamped into and taken out of battery box containers. Such treatment necessitates material of considerable flexibility and resilience. For example, when used in an automobile in the winter reason, the liquid in the battery is liable to become low and if the battery liquid is weak, freezing may result. The flexibility of my material prevents broken cells or cracks in the container under such conditions.

*Smoothness.*—If, as heretofore has been necessary with bituminous mixtures containing vegetable fibers such as paper or cotton linters, water is employed as an ingredient of the mixture, blow holes and sunken spots frequently appear on the finished article. These defects are caused by the presence of steam or gas within the mold. The result is a more or less porous, instead of an extremely dense article, and crazed surfaces.

Finished articles having smooth surfaces and bodies homogeneous throughout are produced by my invention, notwithstanding I employ only dry ingredients. No addition of water is required in my mixture. In fact, I have proven that water, steam, or entrapped air in the mold are sure sources of trouble. I secure better results by substantially different means.

All of the foregoing desirable results are attained by the use of my improved composition or mixture as herein set forth. They have been arrived at only after long and painstaking research and experiment with the purpose of revealing the most satisfactory and economical ingredients for a mixture especially well adapted for the manufacture of battery boxes that fully meet the requirements already specified and to develop the best methods of manipulating the mixture for the production of molded articles having all of the desirable characteristics above mentioned.

My resultant invention is a new combination of ingredients which, considered separately and individually are each old in the art of making bituminous compositions, but combined, processed and manipulated in the manner which I will now describe, they comprise an entirely new industrial material. This material, molded under pressure, produces articles having all of the desired characteristics that have been enumerated in the foregoing statement of the objects of my invention.

*Prepared or treated fibers.*—I first provide a fibrous filler which is capable of withstanding temperatures around four hundred degrees Fahrenheit without permanent loss of tensile strength. Crude asbestos fiber, as mined and commercially used meets the temperature requirement, but it contains foreign elements, upon which sulphuric or other acids have a deteriorating effect.

By experiments and experience I have found that prepared or treated fiber, termed in the trade "fibrous quartz" is free from that defect and is suitable where, as in this case, conditions require high dielectric resistance and imperviousness to acid.

By "treated fiber" is meant fiber from which iron and impurities have been removed by chemical or other means.

My new method and process includes, first, the thorough drying of the fibers to drive out all free moisture.

The treated and dried mineral fiber, or rather loose, feathery, or somewhat spongy character when in bulk is then preferably filled, or partly filled as to its interstices, by adding a suitable fine-grained or powdered filler, such as fibrous quartz sand or silex, or silocel, preferably dried.

The treated asbestos fiber or so-called "fibrous quartz" has considerable tensile strength and the individual fibers retain their strength after being heated. This material is acid proof and does not expand under heat sufficiently to cause breakage or cracking. If silocel, which is lighter than fibrous quartz, is mixed with the latter while dry, and the filler aggregate thus produced is then mixed, preferably while hot, with melted bitumen, the silocel is carried by means of the fibrous quartz into and through the bituminous mass while it is being kneaded. The silocel, being light, could not alone be readily mixed with bitumen by kneading. However, when fibrous quartz is present to carry the silocel, the filler aggregate, quartz and silocel, mix thoroughly and easily with bitumen. Air cells or pockets among the fibers are thereby avoided, the density of the finished product is increased, and a better surface is assured.

Having thus prepared the filler aggregate I compound the bituminous binder as follows:

A bitumen of high melting point, such as gilsonite, is employed, also a bitumen of lower melting point and of greater fluidity in the melted state. Such other bitumen is preferably Mexican asphalt which is less brittle when cold than gilsonite and has greater resilience and flexibility. These two bitumens are placed in separate containers and reduced to the proper state of fluidity by heating.

The lower melting point bitumen, Mexican asphalt, reduces the brittleness of the gilsonite and increases its strength and toughness. It also increases ease of flowing. Consequently the fluid mixture more readily penetrates and thoroughly coats all the filler aggregate. I shall for convenience term the Mexican asphalt or its equivalent a "tempering bitumen" or "vehicle" because it carries the bituminous binder, gilsonite, into and through the mass of filler aggregate.

To further improve the fluidity I may also add mineral rubber, which in its melted state is more fluid than either the gilsonite or the Mexican asphalt, and consequently increases the fluidity of the other bitumens.

The characteristics of each of the above ingredients are such as to supplement each other in the completed hot fluid mixture and to form a bituminous binder having all the advantages enumerated at the beginning of this specification. Individually these characteristics, which reveal the main considerations for adopting them in carrying out my invention, are as follows:

Gilsonite is the base or binder for the other materials. It is practically acid proof and has a high melting point, about five hundred degrees Fahrenheit. Under proper heat control it can be intimately mixed with the other materials and imparts hardness and strength to the product in various and variable degrees, according to the proportions used.

Mexican asphalt melts at about two hundred or two hundred ten degrees Fahrenheit and when melted is readily mixed with melted gilsonite. While hot it increases the fluidity of the gilsonite and during cooling it retards setting. In its solid state it is very elastic and consequently imparts a high degree of elasticity to the gilsonite, increasing the strength of the mass, rendering it more flexible and resistant to shocks and breakage. Mexican asphalt is acid proof and is a good vehicle for carrying the filler aggregate through the fluid mass.

Mexican asphalt is very sticky when melted and if too much is used with gilsonite binder, it can not be satisfactorily kneaded. Instead of acting like a batch of bread dough which is in condition to be properly kneaded, the batch will act more like a batch of dough that is too wet and consequently sticky.

On the other hand, if too little Mexican asphalt is used the mixture of binder and filler aggregate acts like a batch of bread dough that is too dry, and the mass becomes crumbly and has a tendency to divide or roll up into balls of different sizes. If that happens it is virtually impossible afterwards to combine these separate balls into a homogeneous mass without first tearing the individual pieces apart. It is important to use just the right amount of Mexican asphalt, substantially as specified herein.

Mineral rubber is very tough, yet flows easily when melted. It improves the fluidity of the gilsonite and Mexican asphalt binder. It likewise increases the capacity of the fluid to penetrate and cover the filler aggregate, and improves the smoothness of the finished surface.

For making battery boxes having the physical characteristics above described, I employ the ingredients in substantially the following proportions by weight:

| | Per cent. |
|---|---|
| Gilsonite | 25 |
| Prepared or treated asbestos fiber | 25 |
| Silex, silocel, prepared or treated asbestos sand | 25 |
| Mexican asphalt | 20 |
| Wax | 5 |

If the binder is required to have a greater degree of elasticity and toughness, and a somewhat smoother surface, then the quantity of Mexican asphalt will be reduced from twenty per cent to, say, fifteen per cent, and mineral rubber will be added to the amount of five per cent of the total mass.

If lightness is not of such great importance in the finished product, then silex or treated asbestos sand or fibrous quartz sand may be substituted for the silocel, the amount by weight of silex being about thirty per cent more than the corresponding amount of silocel as specified above.

The proportions may vary somewhat according to the desired physical characteristics of the finished product, but in every case I proportion the filler aggregate so as to produce a nonsticky batch that will knead readily, but will not crumble of form balls.

*Method of handling.*—The bitumens, namely, the gilsonite, Mexican asphalt and mineral rubber, having been melted in separate containers, are measured or weighed to the quantity desired and are mixed while hot, preferably in a kneading machine. Next the materials comprising the filler aggregate, namely, the treated asbestos fiber and silocel or asbestos sand, preferably hot, are weighed and added to the bitumens, not as a fibrous mass that requires tearing apart to permit its being impregnated with bitumen, as is common in some processes now in use, but as a loose agglomeration of practically separated fibers, each carrying in its interstices a portion of the powdered silocel or asbestos sand. These fibers are gradually sifted into the molten bituminous mixture. When the right amount of fibrous aggregate has been added, the mass is thoroughly kneaded to the desired consistency, but kept at or above the melting point of the mixed bitumen.

Kneading does not tear or break the asbestos fibers, but causes the binding material to flow or work into and penetrate the mass by squeezing through, completely covering and impregnating the individual fibers of the filler aggregate. When the particles of filler have become thoroughly coated by the bitumen the entire mass is in a somewhat solid state and fairly free from air pockets or pores, yet quite plastic without being sticky. At this stage the mass can be dented, but will not flatten or settle down, and it can be put into a press and formed to the desired shape under heavy pressure.

Mineral rubber becomes fluid at about two hundred degrees Fahrenheit. In making some kinds of articles such as electric fuse plugs, battery box caps etc., I dispense with the mineral rubber and use Mexican asphalt alone as the tempering agent for the gilsonite.

A small amount of wax such as "Montan" wax also may be used to facilitate pulling or extracting the finished articles from the moulds. The wax acts as a lubricant, and its use produces a smoother finished surface.

In carrying forward the usefulness of the mixture prepared as above described, by applying it to the manufacture of containers such as battery boxes having the physical characteristics specified at the commencement of this description, I have developed a new method of manipulating the mass of mixed material.

The new manipulation is especially adapted for increasing the physical strength of the walls, bottom and partitions of the battery box, and avoidance of air holes and crazed surfaces in the product.

My improved method consists in the manipulation of a homogeneous mass, which is formed of bitumen and fibers of any nature, and which have been mixed, puddled, kneaded, or agitated preparatory to moulding, as in the mixture already described. In such a mass the fibers due to mixing or agitation are disposed in all sorts of divergent positions, such as, horizontal, vertical, and miscellaneous undeterminable positions. My new process consists in passing this homogeneous mass between rolls of any desired placement.

In this rolling process the greatest velocity of flow of the mass occurs in the area between the rolls, and the velocity decreases farther back into the mass. Consequently any fiber approaching the area of fastest flow is almost sure at some time during its passage to have one end in a faster flowing part of the mass than its other end. Therefore, there results a parallel rearrangement of the fibers. The fibers straighten out, that is, take up positions parallel to the direction of flow through the rollers. The rolled sheet or layer has by far the greater part of its fibers running lengthwise and imbedded in the binder with ends overlapping like reinforcing bars in a concrete floor slab.

The rolling pressure upon the mass releases gases and pockets of air, making the mass more compact and firm, and serving as a pre-compressing operation.

A slab or sheet of the hot mixture is thus produced, free from entrained air and steam or gases, and having most of its constituent fibers running lengthwise. The fibers are more firmly embedded than they were after the kneading operation. These sheets of hot material can easily be kept hot for later use without danger of their surfaces becoming hardened, as nearly always occurs if a kneaded lump is allowed to cool, even slightly.

If the kneaded mass has been rolled, it can be kept on hand, hot, until the moulding-press is ready to receive it, thus saving time by keeping a supply of material ahead of the press requirements.

If the material is too hot it is weakened by moulding under pressure and if it is too cold or allowed to become chilled it becomes hardened and not plastic enough for moulding. This is overcome in my method by cutting the material, immediately after being rolled, into units of cakes, blocks or sheets, and keeping these sheets hot, as by a hot box, coils or oven which is kept at a fairly uniform temperature. This tempers or anneals the material, permitting the natural cohesion of the blocks to take place to form one pre-compressed laminated mass, when piled and pressed.

I next take the sheet of material as it comes from the rolls and cut it into slabs of proper size and shape to fit the mould. Several such slabs are preferably put into the mould, one on top of another, adjacent slabs having their fibers directed at right angles, the total amount of material in all the slabs equalling the amount required to mould one battery box.

When the mould die descends upon the topmost slab, its pressure causes the material to flow outward along the bottom of the mould and upward, to form the walls and partitions of the battery box. The fibers of each layer flow in parallel directions, overlapping each other. They are not broken, and, therefore, impart to the slab greater strength than if not in the parallel arrangement above described.

Air pockets in the corners of the mould are avoided by this slab arrangement of the material in the bottom of the mould. Heretofore a lump of hot material of the required size was deposited in the center of the mould, and the first action of the die or plunger was to spread the mass over the bottom of the mould, followed by squeezing up into the sides and partitions. In every case, however, pockets of entrapped air were left in the corners of the mould, to later appear on the sides of the finished article as roughnesses of the surface, or crazes.

By my improved method this and other difficulties heretofore encountered in making bituminous battery boxes have been entirely overcome.

Having thus described my invention, what I claim and desire to secure Letters Patent is:

1. The process of making a plastic moldable material which consists in mixing dry acid-resistant fiber with dry pulverized material to such extent as to substantially fill the voids of the individual fibers with pulverized material and thereby cause the fibers to become carriers for said material, impregnating the filled fibers with a hot liquefied bituminous binder, kneading the resultant mass, rolling said mass into sheets, whereby to cause individual fibers therein to assume substantially parallel positions and serve as reinforcing members for said sheet, cutting said sheet into slabs adapted to fit a mold and subjecting said slabs to pressure, thereby causing the material of said slabs to flow outwardly and upwardly and assume the form of a molded article.

2. The process of making a plastic moldable material which consists in mixing dry acid-resistant fiber with dry pulverized acid-resistant material to such extent as to substantially fill the voids of the individual fibers with pulverized material and thereby cause the fibers to become carriers for said material, impregnating the filled fibers with a hot liquefied bituminous binder, and kneading the resultant mass, whereby it becomes tough and adapted for the purpose intended, rolling said mass into sheets to cause individual fibers therein to assume substantially parallel positions and serve as reinforcing members for said sheet, cutting said sheet into slabs adapted to fit a mold, piling said slabs one upon the other and arranged with the fibers of alternate slabs substantially parallel, subjecting the superposed slabs to pressure, thereby causing the material to flow outwardly and upwardly and assume the form of a molded article.

3. A container composed of a filler aggregate in the form of treated asbestos intimately mixed with pulverized earthy material to substantially fill the voids of the individual fibers, said filler comprising substantially fifty per cent, by weight, of the total ingredients and a bituminous binder intimately mixed with said filler and consisting of gilsonite twenty-five per cent, Mexican asphalt twenty per cent, and mineral wax five per cent, said material rolled into sheets and subjected to pressure causing the material to flow and assume the form of said container.

In testimony whereof, I affix my signature.

EDWARD F. GERMAIN.